Patented Jan. 8, 1935

1,986,854

UNITED STATES PATENT OFFICE 1,986,854

CELLULOSE DERIVATIVE COMPOSITIONS

Ebenezer Emmet Reid, Baltimore, Md., assignor to E. I. du Pont de Nemours & Company, Wilmington, Del., a corporation of Delaware No Drawing. Application October 24, 1931, Serial No. 570,964

17 Claims. (Cl. 106—37)

This invention relates to a process of preparing alkyl amides of organic carboxylic acids and to new compositions containing same, and more particularly to cellulose derivative compositions containing polyalkylamides of organic carboxylic acids as plasticizers.

Heretofore a few isolated alkyl amides of organic acids have been prepared by complicated means not suitable for commercial production. The use of such compounds as plasticizers in cellulose derivative compositions has not heretofore been known.

An object of the present invention is to provide a simple and economical process of preparing alkyl amides of organic carboxylic acids suitable for production on a commercial scale, and to provide improved cellulose derivative compositions employing the polyalkylamides of certain organic acids as plasticizers. Other objects of the invention will be apparent from the description given hereinafter.

The above objects are accomplished according to this invention by reacting a mono- or dialkyl amine with a substantially anhydrous liquid comprising an organic carboxylic acid at an elevated temperature, removing the water formed by the reaction substantially as formed, and recovering the amide formed in the liquid.

The process is applicable to the preparation of alkyl amides of organic carboxylic acids generally. The alkyl amines used in the process may contain one or two alkyl groups which may be the same or different. They may be saturated or unsaturated, for example, dicrotylamine may be used. By the term "alkyl", as used herein, is meant a monovalent hydrocarbon radical in which no carbon atom directly attached to the amino nitrogen is a member of an aromatic nucleus, e. g., cyclohexylamine, dibutylamine, and benzylamine. Amines in which two of the valences of the amino nitrogen are satisfied by an organic hydrocarbon radical with two free valences each attached to the amino nitrogen atom may be used. For example, pyrrolidine, in which the tetramethylene radical —CH$_2$.CH$_2$.CH$_2$.CH$_2$.— is attached to the imino group —NH—, or piperidine, in which the pentamethylene radical —CH$_2$.CH$_2$.CH$_2$.CH$_2$.CH$_2$.— is attached to the imino group —NH—. The alkyl group may contain as many as 15 or even 18 carbon atoms, for example, cetylamine or stearylamine. Other amines which may be used are methylamine, dimethylamine, methylethylamine, ethylamine, diethylamine, dipropylamine, dibutylamine, heptylamine, octylamine, decylamine, ethylcetylamine, furylamine, dilaurylamine, ethylbutylamine, or in general any amine which can be vaporized either directly at the pressure and temperature used, or by blowing a stream of an inert gas, such as nitrogen, toluene, xylene, or carbon dioxide, through the amine heated to a suitable high temperature. The amine must contain at least one hydrogen atom directly attached to the amino nitrogen.

The temperature of the reaction may vary widely, but must not be above the decomposition point of the acid nor below the point at which the water is removed from the reaction zone substantially as formed. Temperatures above 350° C. are not suitable, nor are temperatures below 100° C., unless, in the latter case, the reaction is carried out under reduced pressure, or an auxiliary liquid is used which will form a constant boiling mixture with water below 100° C., or an inert gas is passed through the reaction zone so that the water can be removed at temperatures below 100° C. It is preferred to carry out the reaction at 150–250° C. at substantially atmospheric pressure by passing the amine in vapor state into the acid in fused state and recovering the amide formed by distillation of the reaction liquid at reduced pressures. In carrying out the reaction, the amine should be used in slight excess of the theoretical amount required, and this is conveniently accomplished by passing the amine in vapor state into the acid at a rate faster than it can be absorbed; by doing this a further advantage is gained in that the excess gas facilitates removal of the water vapor from the reaction zone.

The process may be carried out at pressures up to 5 atmospheres, or as low as 1/100 of at atmosphere, if desired. The acid may be suspended or dissolved in a neutral liquid substantially free of water, or preferably is used alone in the liquid state, and the removal of the water formed by the reaction may be facilitated by passing a stream of inert gas through the reaction liquid, or an auxiliary liquid may be added to form a constant boiling point mixture with water below 100° C.

The following examples are given to illustrate the preparation of various alkyl amides in accordance with the present invention:

*Example 1. Tetramethylsuccinamide.*—Gaseous dimethylamine is passed into molten succinic acid at 215–250° C. The dimethylamine reacts with the acid to produce tetramethylsuccinamide and water. The dimethylamine is passed into the mixture faster than it can be absorbed, in order that the unabsorbed gas will carry out the water vapor produced in the reaction as fast as it is formed. The operation is continued until no more dimethylamine is absorbed by the mixture. The reaction liquid is then distilled in vacuo, the fraction distilling between 193–198° C. at 30 mm. pressure being tetramethylsuccinamide.

*Example 2. Tetraethyladipamide.*— Diethylamine is vaporized and passed into molten adipic acid at 200–250° C. The diethylamine reacts with the acid to produce tetraethyladipamide and water. The ensuing procedure is the same as in Example 1, the fraction distilling over between 200–250° C. at 10 mm. pressure being tetraethyladipamide.

*Example 3. Dimethylbenzoylbenzamide.*—Dimethylamine is passed into molten benzoylbenzoic acid at 210–250° C. as in Example 1. The resulting product is distilled in vacuo, the fraction distilling over between 215–250° C. at 6 mm. pressure being dimethylbenzoylbenzamide.

*Example 4. Tetrabutylphthalamide.*—Liquid dibutylamine is run into molten phthalic anhydride at 200–250° C. Reaction takes place producing tetrabutylphthalamide and water. An inert gas, such as carbon dioxide or nitrogen, is passed through the mixture to carry out the water vapor produced in the reaction as fast as it is produced. The product is distilled in vacuo, the fraction distilling between 200 and 250° C. at 4 mm. pressure being tetrabutylphthalamide.

*Example 5. Dimethylamides of cottonseed oil acids.*—Gaseous dimethylamine is passed into cottonseed oil acids heated at 170–240° C. Reaction occurs, producing the dimethylamides of cottonseed oil acids and water. The ensuing procedure is the same as in Example 1, the fraction distilling between 240–270° C. at 25 mm. pressure being the dimethylamides of cottonseed oil acids.

*Example 6. Dibutylamides of coconut oil acids.*—A slight excess of dibutylamine is run into coconut oil acids heated at 200–240° C. Reaction occurs, producing the dibutylamides of coconut oil acids and water. A stream of carbon dioxide is passed through the solution to carry out the water vapor as fast as it is produced. The ensuing procedure is as in Example 4, the fraction distilling between 190 and 250° C. at 6 mm. pressure being the dibutylamides of coconut oil acids.

*Example 7. Diethylstearamide.*—Diethylamine is vaporized and passed into molten stearic acid at 200–250° C. Reaction occurs, producing diethyl stearamide and water. The ensuing procedure is as in Example 2, the product distilling between 230–255° C. at 10 mm. pressure being diethylstearamide.

*Example 8. Dibutylabietamide.* — Liquid dibutylamine is run into molten abietic acid at 190–200° C. The ensuing procedure is as in Example 4. The product cannot be distilled, but is dissolved in solvents, decolorized by means of Carboraffin, and crystallized from the solution.

*Example 9. Symmetrical dimethyladipamide.*—Gaseous monomethylamine is passed into molten adipic acid at 200–250° C. The monomethylamine reacts with the acid to produce symmetrical dimethyladipamide and water. The ensuing procedure is the same as in Example 1.

By this process alkylamides in general may be prepared from both mono- and polycarboxylic acids. As monocarboxylic acids particularly suitable for use in this invention may be mentioned the aliphatic acids from formic to stearic including acetic, propionic, butyric, isobutyric, capric, caproic, caprylic, lauric, myristic, palmitic, and stearic; unsaturated acids such as crotonic, acrylic, and oleic; hydroxy acids such as lactic, glycollic, and hydroxystearic; keto acids such as pyruvic and levulinic; mixtures of acids such as those obtained by the hydrolysis of linseed, Chinawood, castor, cottonseed or coconut oils; and aromatic acids such as benzoic, anisic, toluic, salicylic, benzoylbenzoic and naphthoic acids. Polycarboxylic acids have been found to be particularly suitable for this process. Among these may be mentioned adipic, pimelic, suberic, azelaic, succinic, glutaric, maleic, fumaric, sebacic, naphthalic, malonic, trimesic, trimellitic, uvitic, naphthalenetetracarboxylic, tricarballylic, diphenic, quinolinic, and cinchomeronic acids, as well as substituted acids such as citric, malic, itaconic, tartaric, and hydroxyphthalic.

It has been found that the alkylamides above disclosed possess distinct advantages in admixture with cellulose derivatives such as cellulose nitrate, acetate, butyrate, acetobutyrate, ethylcellulose, benzylcellulose, et cetera. These cellulose derivative-alkylamide compositions may be used alone or in combination with natural resins such as rosin, Congo, dammar, et cetera; synthetic resins such as phenol-aldehyde, vinyl, urea-formaldehyde, polyhydric alcohol-polybasic acid, et cetera; drying, semi-drying, or non-drying oils such as linseed, Chinawood, castor, cottonseed oils, et cetera; mineral oils; pigments such as "Titanox", lithopone, iron blues, lakes, iron oxide, carbon black, etc.; solvents; plasticizers; waxes, such as Carnauba, candellilla, paraffin, or beeswax; bitumens; tars; rubber; proteins; fillers, etc., in molded products, in coating compositions for wood, stone, leather, paper, rubber, textiles, metal, etc., in impregnating compositions for paper, cloth, et cetera; in coated fabrics, in adhesives, in safety glass, in laminated paper or wood, in glass substitutes, et cetera.

The polyalkyl amides, particularly those obtained from carboxylic acids containing from 3 to 18 carbon atoms and dialkylamines containing up to 12 carbon atoms in each alkyl group, are suitable as plasticizers for cellulose ethers and cellulose nitrate. They may be used with cellulose nitrate of various degrees of nitration, for example, with high nitration nitrocellulose in propellant powders with or without the addition of nitroglycerin, as well as in blasting explosives comprising nitroglycerin in large amount together with nitrocellulose. The amides derived from aromatic polycarboxylic acids and amines whose alkyl group or groups contain up to 4 carbon atoms and amides from aliphatic polycarboxylic acids and amines containing alkyl groups up to 3 carbon atoms, are particularly suitable as plasticizers for cellulose esters of organic acids, e. g., cellulose acetate, propionate, butyrate, et cetera.

The amides above described in combination with the cellulose derivatives mentioned, give tough, flexible, durable films. The amides are soluble in alcohol, acetone, esters, and the aromatic hydrocarbons commonly used in cellulose derivative compositions. The polyethyl and polymethyl amides of the polycarboxylic acids and of the lower aliphatic monocarboxylic acids are soluble in water, but the higher alkyl amides, e. g., those derived from dipropylamine, dibutylamine, heptylamine, etc., are insoluble in water. These amides vary from white crystalline solids to light colored liquids.

Typical coating compositions containing these amides as plasticizers are given in the following examples:

Example 10

| | Parts |
|---|---|
| Cellulose nitrate | 12 |
| Dammar | 3 |
| Tetrabutyl adipamide | 4 |
| Castor oil | 2.6 |
| Solvent | 166.5 |

Example 11

| | Parts |
|---|---|
| Cellulose nitrate | 12 |
| Dammar | 3 |
| Dibutyl stearamide | 6.6 |
| Solvent | 166.5 |

Example 12

| | Parts |
|---|---|
| Cellulose nitrate | 12 |
| Resin | 3 |
| Castor oil | 2.6 |
| Diethyl stearamide | 4 |
| Solvent | 166.5 |

Example 13

| | Parts |
|---|---|
| Cellulose nitrate | 12 |
| Dimethylamides of coconut oil acids | 6.6 |
| Solvent | 166.5 |

Example 14

| | Parts |
|---|---|
| Cellulose nitrate | 12 |
| Pigment | 16.3 |
| Resin | 3.5 |
| Castor oil | 2.6 |
| Tetrabutyl phthalamide | 4 |
| Solvent | 166.6 |

Example 15

| | Parts |
|---|---|
| Cellulose acetate | 12 |
| Tetraethyladipamide | 6 |
| Solvent | 182 |

Example 16

| | Parts |
|---|---|
| Ethyl cellulose | 4 |
| Tetramethyl phthalamide | 1 |
| Solvent | 24 |

These lacquers and enamels give films which are tack-free in five minutes. The films are tough and flexible and very durable. By the term "solvent", as used in the above examples, is meant a mixture of esters, alcohols, and hydrocarbons such as would be obvious to one skilled in the art. Where the term "resin" is used it is to be understood as natural and synthetic resins which are known to be compatible with the other ingredients. Examples are dammar, ester gum, modified polyhydric alcohol-polybasic acid resins, et cetera.

Typical plastic compositions are given in the following examples:

Example 17

| | Parts |
|---|---|
| Cellulose nitrate | 100 |
| Tetrabutyl adipamide | 35 |

Example 18

| | Parts |
|---|---|
| Cellulose acetate | 100 |
| Tetramethyl succinamide | 40 |

Example 19

| | Parts |
|---|---|
| Cellulose nitrate | 100 |
| Cellulose acetate | 100 |
| Tetramethyl phthalamide | 80 |

Example 20

| | Parts |
|---|---|
| Ethyl cellulose | 100 |
| Tetramethyl adipamide | 20 |

Example 21

| | Parts |
|---|---|
| Cellulose butyrate | 100 |
| Tetraethyl phthalamide | 30 |

Example 22

| | Parts |
|---|---|
| Cellulose propionate | 100 |
| Tetraethyl adipamide | 60 |

Example 23

| | Parts |
|---|---|
| Cellulose aceto-butyrate | 100 |
| Tetraethyl succinamide | 20 |

Example 24

| | Parts |
|---|---|
| Cellulose nitrate | 100 |
| Diethyl stearamide | 30 |

Example 25

| | Parts |
|---|---|
| Cellulose nitrate | 100 |
| Dibutylamides of coconut oil acids | 50 |
| Filler (including pigment) | 200 |

Example 26

| | Parts |
|---|---|
| Cellulose acetate | 100 |
| Tetraethyl sebacamide | 60 |
| Filler (including pigment) | 200 |

Example 27

| | Parts |
|---|---|
| Ethyl cellulose | 100 |
| Tetrabutyl phthalamide | 25 |

The above plastic compositions may be prepared with or without the use of volatile solvents or diluents, that is, one may or may not use alcohol with cellulose nitrate compositions, acetone with cellulose acetate compositions, toluol-alcohol mixtures with cellulose ether compositions, et cetera. It is to be understood that part of the plasticizer in the above coating and plastic compositions may be replaced by other alkyl amide plasticizers or by one of the heretofore known plasticizers, such as dibutyl phthalate, triacetin, camphor, dimethyl phthalate, acetanilide, triphenyl phosphate, and the like.

The cellulose derivative compositions described above are adapted for all the uses to which such compositions are usually put. They are particularly suitable for use as lacquers for coating metal and wood and dopes for coating fabrics. The plastic compositions are adapted for use in the manufacture of toilet articles, novelties, sheeting, rods, tubes, and similar articles.

A particular advantage in the use of the amides herein described with cellulose derivatives is due to the fact that these amides have low vapor pressures and therefore maintain films made from cellulose derivative compositions including these amides in a permanently flexible condition and greatly increase the durability of the films.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a cellulose derivative and a polyalkylamide of an organic carboxylic acid containing from 3-18 carbon atoms, inclusive.

2. A composition of matter comprising a cellulose derivative and a polyalkylamide of an organic carboxylic acid containing from 3-18 carbon atoms, inclusive, in which amide the alkyl groups directly attached to the amino nitrogen atom contain from 1-12 carbon atoms, inclusive.

3. A composition of matter comprising a cellulose derivative and a polyalkylamide of an organic carboxylic acid containing from 3-18 carbon atoms, inclusive, in which amide the alkyl groups directly attached to the amino nitrogen atom contain from 1-8 carbon atoms, inclusive.

4. A composition of matter comprising a cellulose derivative and a polyalkylamide of an organic carboxylic acid containing from 3-18 carbon atoms, inclusive, in which amide the alkyl groups directly attached to the amino nitrogen atom contain from 1-4 carbon atoms, inclusive.

5. A composition of matter comprising a cellulose derivative from the class consisting of cellulose nitrate and cellulose ethers and a polyalkylamide of an organic carboxylic acid containing from 3-18 carbon atoms, inclusive, in which amide the alkyl groups directly attached to the amino nitrogen atom contain from 1-12 carbon atoms, inclusive.

6. A composition comprising a cellulose derivative from the group consisting of cellulose nitrate and cellulose ethers, and a polyalkylamide of a monocarboxylic acid containing from 3-18 carbon atoms, inclusive, in which amide each alkyl group directly attached to the amido nitrogen atom contains 1-4 carbon atoms, inclusive.

7. A composition of matter comprising a cellulose derivative and a polyalkylamide of an organic carboxylic acid containing from 3-18 carbon atoms, inclusive, in which amide the alkyl groups directly attached to the amino nitrogen atom contain from 1-3 carbon atoms, inclusive.

8. A composition of matter comprising a cellulose derivative from the class consisting of cellulose nitrates and cellulose ethers and a polyalkylamide of an organic carboxylic acid containing from 3-18 carbon atoms, inclusive, in which amide each alkyl group directly attached to the amino nitrogen atom contains from 1-3 carbon atoms, inclusive.

9. A composition of matter comprising a cellulose derivative and a polyalkylamide of an organic polycarboxylic acid containing from 3-18 carbon atoms, inclusive, in which amide each alkyl group directly attached to the amino nitrogen atom contains from 1-3 carbon atoms, inclusive.

10. A composition comprising a cellulose derivative and a polyalkylamide of a polycarboxylic acid from the group consisting of succinic, adipic and phthalic acids, in which amide each alkyl group directly attached to an amido nitrogen atom contains from 1-3 carbon atoms, inclusive.

11. A composition of matter comprising cellulose acetate and a polyalkylamide of an organic polycarboxylic acid containing from 3-18 carbon atoms, inclusive, in which amide each alkyl group directly attached to the amino nitrogen atom contains from 1-2 carbon atoms, inclusive.

12. A composition of matter comprising cellulose nitrate and a polyalkylamide of an organic carboxylic acid containing from 3-18 carbon atoms, inclusive, in which amide each alkyl group directly attached to the amino nitrogen atom contains from 1-4 carbon atoms, inclusive.

13. A composition of matter comprising cellulose nitrate and a polyalkylamide of an organic polycarboxylic acid containing from 3-18 carbon atoms, inclusive, in which amide each alkyl group directly attached to the amino nitrogen atom contains from 1-4 carbon atoms, inclusive.

14. A composition comprising a cellulose derivative from the group consisting of cellulose nitrate and cellulose ethers, and a polyalkylamide of a polycarboxylic acid from the group consisting of succinic, adipic and phthalic acids, in which amide each alkyl group directly attached to an amido nitrogen atom contains 1-4 carbon atoms, inclusive.

15. A composition of matter comprising cellulose nitrate and dibutylstearamide.

16. A composition of matter comprising cellulose acetate and tetramethylphthalamide.

17. A composition of matter comprising ethyl cellulose and dibutylstearamide.

EBENEZER EMMET REID.